(12) United States Patent
Chakraborti et al.

(10) Patent No.: US 12,481,866 B2
(45) Date of Patent: Nov. 25, 2025

(54) METHOD AND SYSTEM FOR MAINTAINING LATENT DIRICHLET ALLOCATION MODEL ACCURACY

(71) Applicant: JPMorgan Chase Bank, N.A., New York, NY (US)

(72) Inventors: Deepanjan Chakraborti, Kolkata (IN); Luke Meier, Frisco, TX (US); Brandon Chihkai Yang, Chicago, IL (US); Maria Beltran, Chicago, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 305 days.

(21) Appl. No.: 18/132,661

(22) Filed: Apr. 10, 2023

(65) Prior Publication Data

US 2024/0289595 A1 Aug. 29, 2024

(30) Foreign Application Priority Data

Feb. 24, 2023 (IN) .............................. 202311012684

(51) Int. Cl.
| | |
|---|---|
| *G06F 40/30* | (2020.01) |
| *G06F 40/279* | (2020.01) |
| *G06N 3/0475* | (2023.01) |
| *G06N 3/08* | (2023.01) |

(52) U.S. Cl.
CPC ......... *G06N 3/0475* (2023.01); *G06F 40/279* (2020.01)

(58) Field of Classification Search
CPC ....... G06F 18/2413; G06F 40/30; G06F 40/35
USPC .............................. 704/1, 9; 706/12; 707/738
See application file for complete search history.

(56) References Cited

U.S. PATENT DOCUMENTS

| | | | | |
|---|---|---|---|---|
| 8,782,197 | B1* | 7/2014 | Liu | G06Q 30/0277 |
| | | | | 725/74 |
| 10,540,381 | B1* | 1/2020 | Rings | G06F 40/20 |
| 2016/0132373 | A1* | 5/2016 | Yoshinaga | G06N 20/00 |
| | | | | 714/28 |
| 2017/0116203 | A1* | 4/2017 | Lightner | G06F 16/9535 |
| 2019/0122145 | A1* | 4/2019 | Sun | G06F 40/30 |
| 2021/0073671 | A1* | 3/2021 | Puri | G06N 5/04 |
| 2023/0069347 | A1* | 3/2023 | Backhus | G06N 5/04 |
| 2023/0137905 | A1* | 5/2023 | Machireddy | G06N 3/098 |
| | | | | 706/25 |
| 2023/0144585 | A1* | 5/2023 | Asthana | G06N 20/00 |
| | | | | 706/12 |
| 2024/0176958 | A1* | 5/2024 | Raimondo | G06F 40/35 |

OTHER PUBLICATIONS

Hu et al., "Explore the Evolution of Development Topics via On-Line LDA", 2015 IEEE 22nd International Conference on Software Analysis, Evolution, and Reengineering (SANER), Mar. 2-6, 2015, pp. 555 to 559. (Year: 2015).*

*Primary Examiner* — Martin Lerner
(74) *Attorney, Agent, or Firm* — GREENBLUM & BERNSTEIN, P.L.C.

(57) ABSTRACT

A method and a system for counteracting model drift in a Latent Dirichlet Allocation (LDA) model by maintaining freshness and accuracy in the LDA model by leveraging LDA classification and vector algebra to detect potential degradations are provided. The method entails determining whether an LDA model has drifted and therefore requires retraining based on measurements of cosine similarities of respective topics that correspond to two LDA models and a topic match entropy between the two LDA models that is determined based on the measurements.

20 Claims, 7 Drawing Sheets

METHOD AND SYSTEM FOR MAINTAINING LATENT DIRICHLET ALLOCATION MODEL ACCURACY

CROSS-REFERENCE TO RELATED APPLICATIONS

This application claims priority benefit from Indian Application No. 202311012684, filed Feb. 24, 2023 in the India Patent Office, which is hereby incorporated by reference in its entirety.

BACKGROUND

1. Field of the Disclosure

This technology generally relates to methods and systems for using a model to identify topics and word patterns in a corpus of unstructured text, and more particularly to methods and systems for counteracting model drift by maintaining freshness and accuracy in a Latent Dirichlet Allocation (LDA) model by leveraging LDA classification and vector algebra to detect potential degradations.

2. Background Information

Unsupervised Latent Dirichlet Allocation (LDA) models are used to identify underlying word patterns and/or topics in a corpus of unstructured messages. In order to facilitate their consumption, the topics defined by an LDA model need to be interpreted and translated into semantic labels easily understood by the end user through a mapping process that may be costly in time and resources. The labels generated and the percentage of the corpus associated to each one of them provides the consumer with a deeper understanding of what would otherwise be a disorganized array of messages. Once established, this model may be extended to effectively become a supervised classification version by periodically assigning new, incoming messages from the same source to the established labels.

When used within a business context, the results of the model may trigger actions and responses with different goals, entailing potentially large costs. Effectively deploying a timely, appropriate business response depends on the model's continued ability to correctly label incoming messages. It can be expected that the content of the messages changes over time, thus causing a phenomenon known as model drift, or that new topics emerge within the same, also referred to herein as "emerging topics". For this reason, it is essential to implement guardrail processes that maintain model freshness by flagging the drifts and addressing them in the least resource intensive manner.

One way to maintain model freshness is to retrain a model on a regular basis. This would be the preferred option given unlimited resources. However, there are costs associated with model retraining. Data scientists are required to administer the training process, and training requires the use of limited computational resources. Business partners may have limited resources to provide long term support in the semantic labeling process.

Accordingly, there is a need for a method for counteracting model drift by maintaining freshness and accuracy in a Latent Dirichlet Allocation (LDA) model by leveraging LDA classification and vector algebra to detect potential degradations.

SUMMARY

The present disclosure, through one or more of its various aspects, embodiments, and/or specific features or sub-components, provides, inter alia, various systems, servers, devices, methods, media, programs, and platforms for methods and systems for counteracting model drift by maintaining freshness and accuracy in a Latent Dirichlet Allocation (LDA) model by leveraging LDA classification and vector algebra to detect potential degradations.

According to an aspect of the present disclosure, a method for maintaining freshness in a Latent Dirichlet Allocation (LDA) model is provided. The method is implemented by at least one processor. The method includes: receiving, by the at least one processor, a first corpus that includes a first set of textual data; generating, by the at least one processor, a first set of LDA topics by applying a first LDA model to the first corpus; generating, by the at least one processor for each respective topic from among the first set of LDA topics, a corresponding vector of words with associated weights; measuring, by the at least one processor, a cosine similarity of at least a first topic from among the first set of LDA topics with respect to at least one topic from among a second set of LDA topics that is associated with a second LDA model; determining, based on a result of the measuring, a topic match entropy between the first LDA model and the second LDA model; and when the topic match entropy exceeds a predetermined threshold, determining that the first LDA model has drifted and requires retraining.

The first corpus may include an Action-Based Conversations Dataset (ABCD) corpus that is associated with a predetermined year.

For each respective topic from among the first set of LDA topics, the corresponding vector may have a length that is equal to a number of words included in a vocabulary used for training the first LDA model.

For each respective topic from among the first set of LDA topics, each respective word included in the corresponding vector may be associated with a corresponding weight that represents a topic-word density that indicates a strength of association between the respective word and the respective topic.

For the first topic from among the first set of LDA topics, the at least one topic from among the second set of LDA topics for which the cosine similarity is measured may correspond to a cosine similarity that falls in a range of between 0.85 and 1.00.

Each of the first LDA model and the second LDA model may be trained by using a first subset of a predetermined sampling of the first corpus and a second subset of the predetermined sampling of the first corpus, a content of the first subset being mutually exclusive with respect to a content of the second subset.

Alternatively, each of the first LDA model and the second LDA model may be trained by using a first subset of a predetermined sampling of the first corpus and a second set that is generated by replacing a predetermined portion of a second subset of the predetermined sampling of the first corpus with a randomly selected sampling of a second corpus, a content of the first subset being mutually exclusive with respect to a content of the second subset.

As another alternative, each of the first LDA model and the second LDA model may be trained by using a first subset of a predetermined sampling of the first corpus and a second set that includes a sampling of a set of synthetically generated documents.

According to another exemplary embodiment, a computing apparatus for maintaining freshness in a Latent Dirichlet Allocation (LDA) model is provided. The computing apparatus includes a processor; a memory; and a communication interface coupled to each of the processor and the memory.

The processor is configured to: receive, via the communication interface, a first corpus that includes a first set of textual data; generate a first set of LDA topics by applying a first LDA model to the first corpus; generate, for each respective topic from among the first set of LDA topics, a corresponding vector of words with associated weights; measure a cosine similarity of at least a first topic from among the first set of LDA topics with respect to at least one topic from among a second set of LDA topics that is associated with a second LDA model; determine, based on a result of the measurement, a topic match entropy between the first LDA model and the second LDA model; and when the topic match entropy exceeds a predetermined threshold, determine that the first LDA model has drifted and requires retraining.

The first corpus may include an Action-Based Conversations Dataset (ABCD) corpus that is associated with a predetermined year.

For each respective topic from among the first set of LDA topics, the corresponding vector may have a length that is equal to a number of words included in a vocabulary used for training the first LDA model.

For each respective topic from among the first set of LDA topics, each respective word included in the corresponding vector may be associated with a corresponding weight that represents a topic-word density that indicates a strength of association between the respective word and the respective topic.

For the first topic from among the first set of LDA topics, the at least one topic from among the second set of LDA topics for which the cosine similarity is measured may correspond to a cosine similarity that falls in a range of between 0.85 and 1.00.

Each of the first LDA model and the second LDA model may be trained by using a first subset of a predetermined sampling of the first corpus and a second subset of the predetermined sampling of the first corpus, a content of the first subset being mutually exclusive with respect to a content of the second subset.

Alternatively, each of the first LDA model and the second LDA model may be trained by using a first subset of a predetermined sampling of the first corpus and a second set that is generated by replacing a predetermined portion of a second subset of the predetermined sampling of the first corpus with a randomly selected sampling of a second corpus, a content of the first subset being mutually exclusive with respect to a content of the second subset.

As another alternative, each of the first LDA model and the second LDA model may be trained by using a first subset of a predetermined sampling of the first corpus and a second set that includes a sampling of a set of synthetically generated documents.

According to yet another exemplary embodiment, a non-transitory computer readable storage medium storing instructions for maintaining freshness in a Latent Dirichlet Allocation (LDA) model is provided. The storage medium includes executable code which, when executed by a processor, causes the processor to: receive a first corpus that includes a first set of textual data; generate a first set of LDA topics by applying a first LDA model to the first corpus; generate, for each respective topic from among the first set of LDA topics, a corresponding vector of words with associated weights; measure a cosine similarity of at least a first topic from among the first set of LDA topics with respect to at least one topic from among a second set of LDA topics that is associated with a second LDA model; determine, based on a result of the measurement, a topic match entropy between the first LDA model and the second LDA model; and when the topic match entropy exceeds a predetermined threshold, determine that the first LDA model has drifted and requires retraining.

The first corpus may include an Action-Based Conversations Dataset (ABCD) corpus that is associated with a predetermined year.

For each respective topic from among the first set of LDA topics, the corresponding vector may have a length that is equal to a number of words included in a vocabulary used for training the first LDA model.

For each respective topic from among the first set of LDA topics, each respective word included in the corresponding vector may be associated with a corresponding weight that represents a topic-word density that indicates a strength of association between the respective word and the respective topic.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
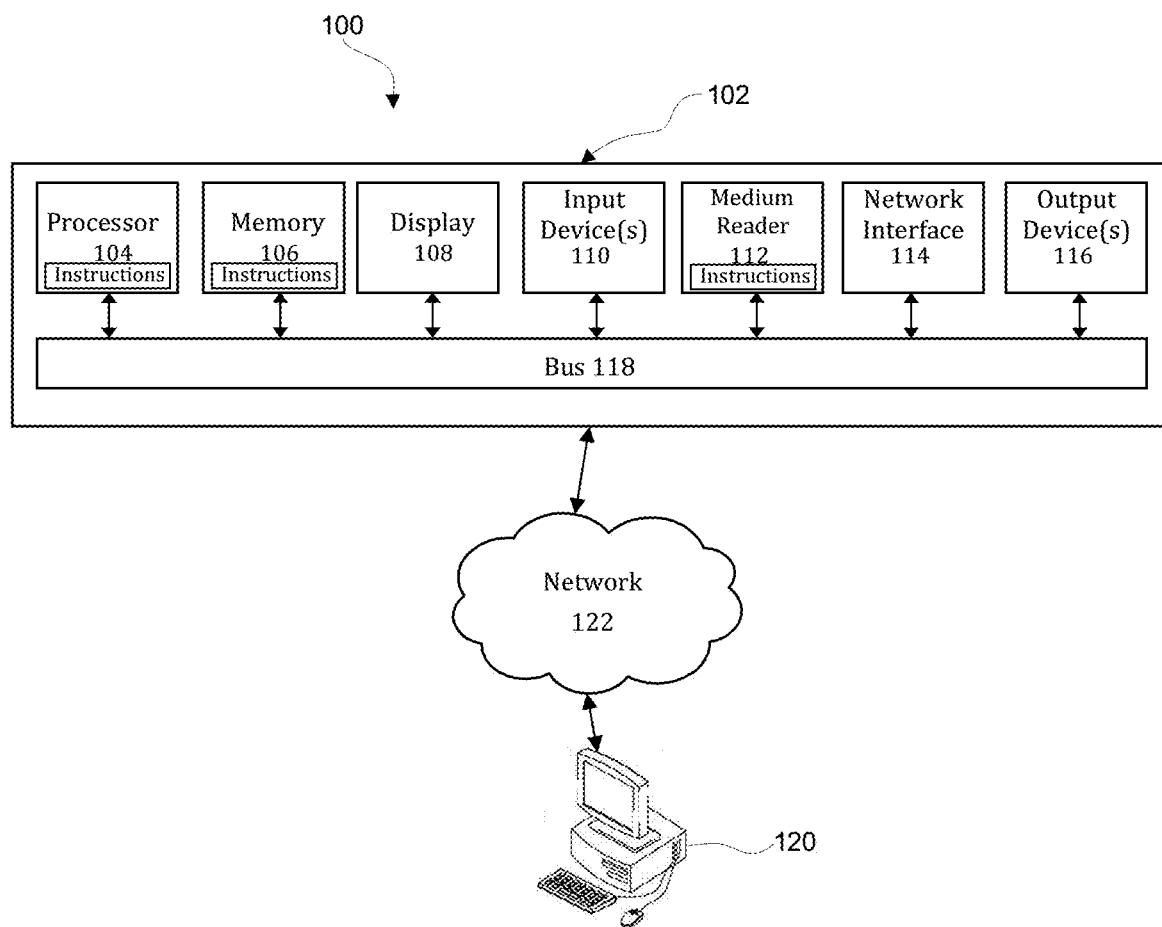
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for counteracting model drift by maintaining freshness and accuracy in a Latent Dirichlet Allocation (LDA) model by leveraging LDA classification and vector algebra to detect potential degradations. In addition, alternative embodiments provide optimized methods and systems for counteracting model drift by maintaining freshness and accuracy in a non-LDA model by leveraging classification and vector algebra to detect potential degradations, where the non-LDA model may include any other type of model that expresses topics as vectors of tokens and weights, noting that the topics may be generated by various algorithms other than an LDA algorithm.

Figure 2:
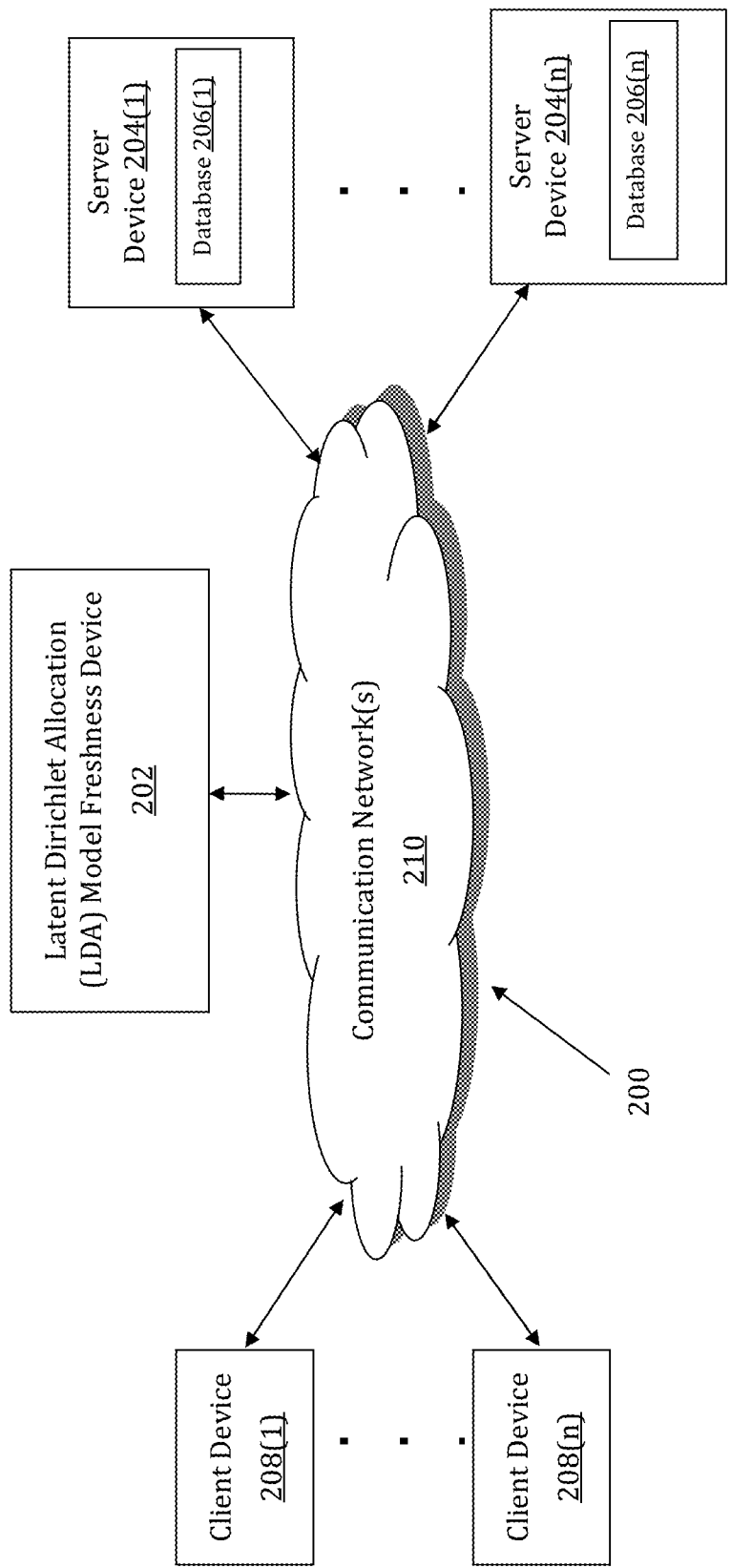
FIG. 2 illustrates an exemplary diagram of a network environment.

Referring to FIG. 2, a schematic of an exemplary network environment 200 for implementing a method for counteracting model drift by maintaining freshness and accuracy in a Latent Dirichlet Allocation (LDA) model by leveraging LDA classification and vector algebra to detect potential degradations is illustrated. In an exemplary embodiment, the method is executable on any networked computer platform, such as, for example, a personal computer (PC).

The method for counteracting model drift by maintaining freshness and accuracy in a LDA model by leveraging LDA classification and vector algebra to detect potential degradations may be implemented by a Latent Dirichlet Allocation Model Freshness (LDAMF) device 202. The LDAMF device 202 may be the same or similar to the computer system 102 as described with respect to FIG. 1. The LDAMF device 202 may store one or more applications that can include executable instructions that, when executed by the LDAMF device 202, cause the LDAMF device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the LDAMF device 202 itself, may be located in virtual server(s) running in a cloud-based computing environment rather than being tied to one or more specific physical network computing devices. Also, the application(s) may be running in one or more virtual machines (VMs) executing on the LDAMF device 202. Additionally, in one or more embodiments of this technology, virtual machine(s) running on the LDMF device 202 may be managed or supervised by a hypervisor.

In the network environment 200 of FIG. 2, the LDAMF device 202 is coupled to a plurality of server devices 204(1)-204(n) that hosts a plurality of databases 206(1)-206(n), and also to a plurality of client devices 208(1)-208(n) via communication network(s) 210. A communication interface of the LDAMF device 202, such as the network interface 114 of the computer system 102 of FIG. 1, operatively couples and communicates between the LDAMF device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG.

1, although the LDAMF device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and LDAMF devices that efficiently implement a method for counteracting model drift by maintaining freshness and accuracy in a LDA model by leveraging LDA classification and vector algebra to detect potential degradations.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The LDAMF device 202 may be a standalone device or integrated with one or more other devices or apparatuses, such as one or more of the server devices 204(1)-204(n), for example. In one particular example, the LDAMF device 202 may include or be hosted by one of the server devices 204(1)-204(n), and other arrangements are also possible. Moreover, one or more of the devices of the LDAMF device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the LDAMF device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store textual corpus data and information that relates to metrics for topic model decay, topic variability, and topic similarity.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the LDAMF device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the LDAMF device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the LDAMF device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the LDAMF device 202, the server devices 204(1)-204(n), or the client devices 208(1)-208(n), for example, may be configured to operate as virtual instances on the same physical machine. In other words, one or more of the LDAMF device 202, the server devices 204(1)-204(n), or the client devices 208(1)-208(n) may operate on the same physical device rather than as separate devices communicating through communication network(s) 210. Additionally, there may be more or fewer LDAMF devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
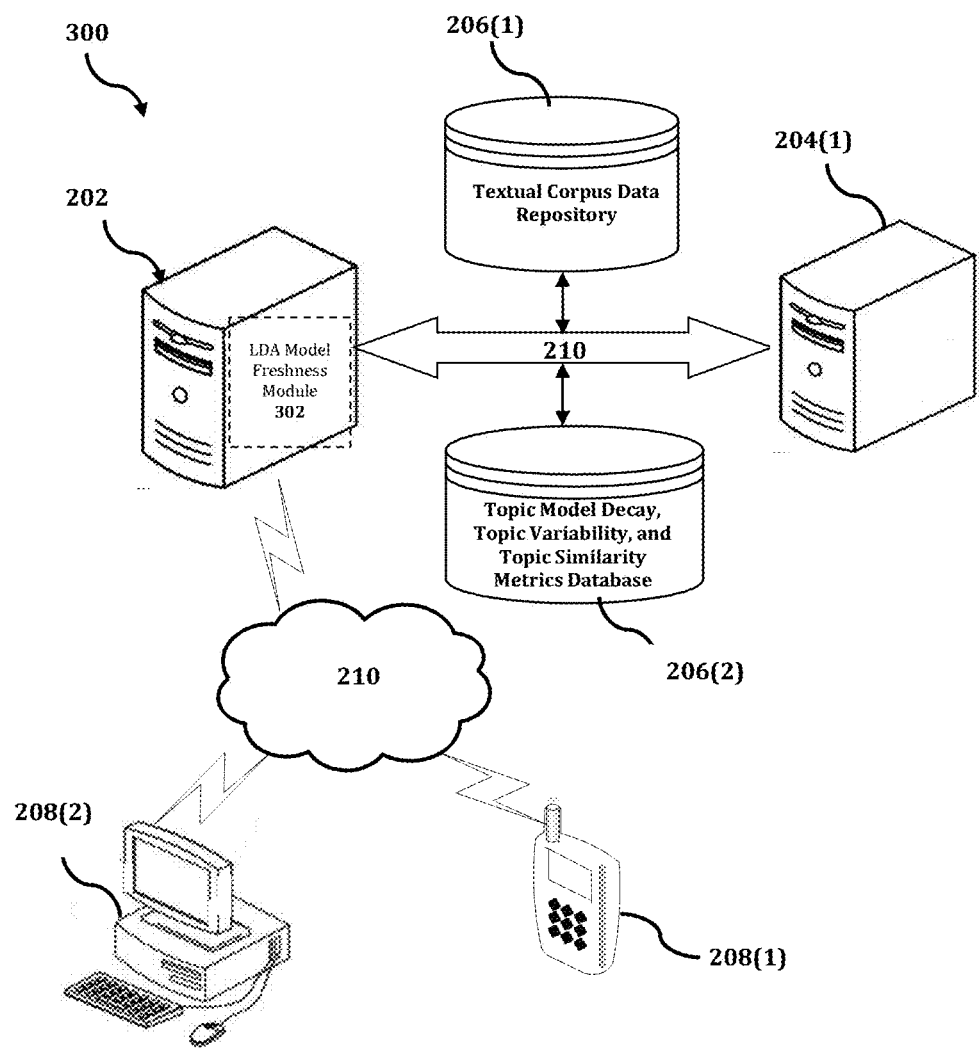
FIG. 3 shows an exemplary system for implementing a method for counteracting model drift by maintaining freshness and accuracy in a Latent Dirichlet Allocation (LDA) model by leveraging LDA classification and vector algebra to detect potential degradations.

The LDAMF device 202 is described and illustrated in FIG. 3 as including a LDA model freshness module 302, although it may include other rules, policies, modules, databases, or applications, for example. As will be described below, the LDA model freshness module 302 is configured to implement a method for counteracting model drift by maintaining freshness and accuracy in a LDA model by leveraging LDA classification and vector algebra to detect potential degradations. In addition, in an alternative embodiment, the LDA model freshness module 302 may also be configured to implement a method for counteracting model drift by maintaining freshness and accuracy in a non-LDA model by leveraging classification and vector algebra to detect potential degradations, where the non-LDA model may include any other type of model that expresses topics as vectors of tokens and weights, noting that the topics may be generated by various algorithms other than an LDA algorithm.

An exemplary process 300 for implementing a mechanism for counteracting model drift by maintaining freshness and accuracy in a LDA model by leveraging LDA classification and vector algebra to detect potential degradations by utilizing the network environment of FIG. 2 is illustrated as being executed in FIG. 3. Specifically, a first client device 208(1) and a second client device 208(2) are illustrated as being in communication with LDAMF device 202. In this regard, the first client device 208(1) and the second client device 208(2) may be "clients" of the LDAMF device 202 and are described herein as such. Nevertheless, it is to be known and understood that the first client device 208(1) and/or the second client device 208(2) need not necessarily be "clients" of the LDAMF device 202, or any entity described in association therewith herein. Any additional or alternative relationship may exist between either or both of the first client device 208(1) and the second client device 208(2) and the LDAMF device 202, or no relationship may exist.

Further, LDAMF device 202 is illustrated as being able to access a textual corpus data repository 206(1) and a topic model decay, topic variability, and topic similarity metrics database 206(2). The LDA model freshness module 302 may be configured to access these databases for implementing a method for counteracting model drift by maintaining freshness and accuracy in a LDA model by leveraging LDA classification and vector algebra to detect potential degradations.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the LDAMF device 202 via broadband or cellular communication. Of course, these embodiments are merely exemplary and are not limiting or exhaustive.

Upon being started, the LDA model freshness module 302 executes a process for counteracting model drift by maintaining freshness and accuracy in a LDA model by leveraging LDA classification and vector algebra to detect potential degradations. An exemplary process for counteracting model drift by maintaining freshness and accuracy in a LDA model by leveraging LDA classification and vector algebra to detect potential degradations is generally indicated at flowchart 400 in FIG. 4.

Figure 4:
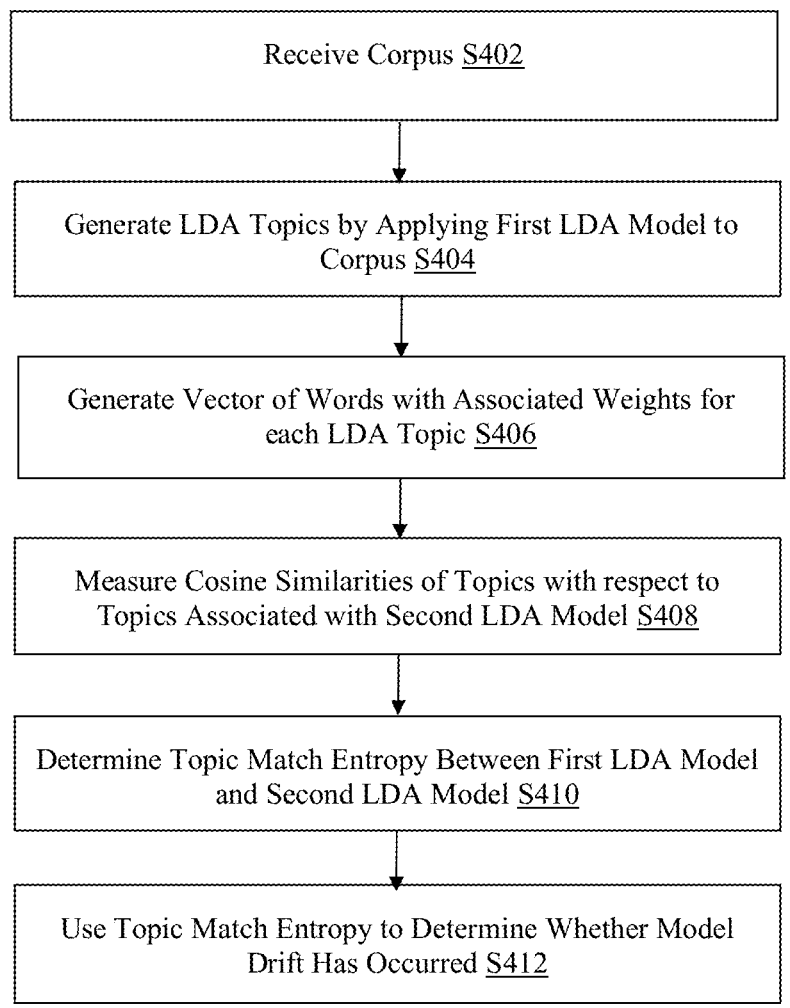
FIG. 4 is a flowchart of an exemplary process for implementing a method for counteracting model drift by maintaining freshness and accuracy in an LDA model by leveraging LDA classification and vector algebra to detect potential degradations.

In process 400 of FIG. 4, at step S402, the LDA model freshness module 302 receives a first corpus that includes a first set of textual data. In an exemplary embodiment, the first corpus may include an Action-Based Conversations Dataset (ABCD) corpus that is associated with a particular year, such as, for example, the ABCD 2019 corpus. The first corpus may also include any other corpus that is associated with Automated Clearing House (ACH) data.

At step S404, the LDA model freshness module 302 generates a first set of LDA topics by applying a first LDA model to the first corpus. In an exemplary embodiment, the first LDA model is trained to generate a fixed number k of topics which are lists of N tokens ranked by their relevance within the given topic, where N is equal to the length of the vocabulary used for training the first LDA model.

At step S406, the LDA model freshness module 302 generates, for each respective topic generated in step S404, a corresponding vector of words with associated weights. In an exemplary embodiment, each such vector has a length of N, i.e., the length of each vector is equal to the number of words included in the vocabulary used for training the first LDA model. In an exemplary embodiment, for each particular vector, each respective word included in the particular vector is associated with a corresponding weight that represents a topic-word density that indicates a strength of an association between the respective word and the respective topic.

At step S408, the LDA model freshness module 302 measures a cosine similarity of at least one topic with respect to a corresponding topic that is associated with a second LDA model. The cosine similarity is defined as being equal to the cosine of an angle between the corresponding vectors. In an exemplary embodiment, the measurement of the cosine similarity is performed for each topic included in the first set of LDA topics generated in step S404, and the corresponding topic is selected from among a second set of LDA topics associated with the second LDA model such that the cosine similarity has a value of between 0.85 and 1.00. In an exemplary embodiment, for each respective cosine similarity value as between a respective pair of topics, a corresponding cosine distance value may be calculated by subtracting the respective cosine similarity value from 1.0; i.e., Cosine Distance=1.0−Cosine Similarity. Thus, when the cosine similarity is equal to 0.85, then the cosine distance is equal to 0.15; and when the cosine similarity is equal to 0.93, then the cosine distance is equal to 0.07.

At step S410, the LDA model freshness module 302 uses a result of the measurement(s) performed in step S408 to determine a topic match entropy between the first LDA model and the second LDA model. In an exemplary embodiment, the topic match entropy is a measure of how confidently one may assert that a topic in one model (i.e., the first LDA model) is a one-to-one match in another model (i.e., the second LDA model). A mathematical expression for calculating a value for the topic match entropy is provided in Equation 8 below. Then, at step S412, the LDA model freshness module 302 compares the topic match entropy with a predetermined threshold value in order to determine whether model drift has occurred with respect to the first LDA model, and if so, that retraining of the first LDA model is required in order to maintain freshness and ensure accuracy in subsequent uses of the first LDA model.

In an exemplary embodiment, the first and second LDA models may be trained in various ways, which may result in variations in the corresponding measurements of topic match entropy as between the two LDA models. In a first scenario, a sampling of the first corpus may be divided into two mutually exclusive subsets thereof, and each LDA model may be trained by using the first subset and then retrained by using the second subset. In a second scenario, the same sampling of the first corpus may be divided into the same two mutually exclusive subsets, and then a predetermined portion of the second subset may replaced with a randomly selected portion of a second corpus, i.e., a "contamination" of the second subset; and then each LDA model may be trained by using the first subset and then retrained by using the contaminated version of the second subset. In a third scenario, the same sampling of the first corpus may be used, but instead of dividing the sampling into subsets, the entirety of the sampling may be used as a first set of training data, and a second set of training data may be obtained by sampling a synthetically generated set of documents.

LDA Topic Modeling: In an exemplary embodiment, at a high level, LDA models are trained to generate a fixed number k of topics which are lists of N tokens ranked by their relevance within the given topic. The tokens are sourced from the "model dictionary," which is a compilation of the prominent word s and topics within the corpus. Next, during the assignment phase, a fit score is applied that measures the affinity between each incoming message and each topic. In general, the topic with the best fit score is designated as the topic of incoming communication.

Topic Definitions in LDA Models: LDA topics are expressed as a k vectors of words with associated weights. The length of the topic vector, N is the length of the vocabulary with which the LDA model has been trained. The topic vector may be expressed as shown in Expression 1 below:

$$T_i : (\beta_1 w_1, \beta_2 w_2, \ldots \beta_N w_N) \quad (1)$$

$\beta$ represents topic-word density. A high $\beta$ value indicates a word strongly associated with a given topic, whereas a low $\beta$ value indicates words that the model does not associate with that topic. All words in the model vocabulary will receive a weight for each topic. In an exemplary embodiment, all of the topics defined by an LDA model can be expressed as a k by N matrix.

Topic Model Decay—Data Drift: One way model performance can degrade is if the words used by customers regarding a particular topic changes. Some words that were more common in historical topic communication may be missing and other words may become more prevalent. The quality of the fit score will go down as the model undervalues the weights of the importance of such other words and prominent words the model expects to see on that topic will be missing and drag the fit score down. This degradation in the model's ability to associate incoming communication with related historical patterns is known as data drift.

Another kind of variability occurs between models trained on samples from the same data set because of randomness in the model development process. Both of these sources of differences between model topic definitions are discussed further below.

Topic Similarity Using Cosine Distance: In an exemplary embodiment, one objective with respect to model freshness is to identify when new topics emerge or when existing topics recede over time. The latter can be seen by a decrease number of incoming communications that are labeled with a given topic. If customers change how they talk about a topic, it is important to update the corresponding topic word weights to better reflect the prevalence of words in more recent communication. This may be accomplished by comparing the word weights that make up the topic definitions in models trained on customer inputs from different time periods, such as, for example, the most recent M months versus the preceding N months. Topics in a new model that are sufficiently different from any found in the previous model are labeled as new. Topics that are sufficiently similar to a topic in the old model are considered to be the same topic. The updated word weights in the new model are then adopted for classification of future incoming communication.

Cosine Similarity: Cosine similarity may be used to compare or rank documents with respect to a vector of topic-words weights $\beta$. Cosine similarity provides a measure of similarity by calculating the cosine of the angle between two vectors. Cosine similarity is highest when the vectors point in the same direction, i.e., the angle between the two vectors is equal to zero, and the cosine thereof is equal to one (1.0). Cosine similarity is lowest when the vectors are orthogonal, i.e., the angle between the two vectors is equal to ninety degrees (90°).

For two topic vectors A and B, the cosine similarity is defined as expressed in Equation 2 below:

$$\text{Cosine Similarity } (A, B) = \frac{A \cdot B}{\|A\| \cdot \|B\|} \quad (2)$$

Cosine Distance for Topic Similarity: Cosine distance is the complement of Cosine similarity, as expressed in Equation 3 below:

$$\text{Cosine Distance} = 1 - \text{Cosine Similarity} \quad (3)$$

The Topics in an LDA model can be expressed as word weight vectors which are the length of the model vocabulary. In an exemplary embodiment, to compare topics from different models, the cosine distance may be used. The distance between $\text{Topic}_i$ and $\text{Topic}_j$ is defined as expressed below in Equation 4:

$$\text{Distance}(T_i, T_j) = \text{CosineDistance}(LDA_1(T_i), LDA_2(T_j)) \quad (4)$$

where $T_i$ is the i-th topic vector from LDA model 1 and $T_j$ is the j-th topic vector from LDA model 2. Both models are trained with same vocabulary, but the training data sets may be different in some way. The scalar magnitudes of these topic vectors may expressed as in Equations 5 and 6 below:

$$(\text{Topic}_i)T_i = \sum_i \beta_i w_i \quad (5)$$

$$(\text{Topic}_j)T_j = \sum_j \beta_j w_j \quad (6)$$

where $w_i$ and $w_j$ are the words in the model vocabulary.

A measure of difference, which may or may not be caused by data drift, between $T_i$ and $T_j$ using Cosine Distance is provided below in Equation 7:

$$\text{Cosine Distance Based Drift} = \left(1 - \frac{\sum_{ij}\beta_i\beta_j}{\sum_i\beta_i^2\sum_j\beta_j^2}\right) \quad (7)$$

Topic Match Entropy is a measure of how confidently it may be asserted that a topic in one model is a one-to-one match to a topic in another model. Topic Match Entropy is driven by the difference in the strength of the match between a topic in one model and the best and second-best topic matches in a second model. A model topic for which there are more than one best matches of similar strength in a second model is said to have higher Topic Match Entropy. High Topic Match Entropy is associated with high uncertainty and/or high ambiguity in identifying a one-to-one match for a topic in a second model. Conversely, a low Topic Match Entropy is associated with low uncertainty and/or high confidence in identifying a one-to-one match for a topic in a second model. An expression for Topic Match Entropy is given below in Equation 8:

$$\text{Topic Match Entrophy} = (1st \text{CosD})/1 - (\text{ABS}|1st \text{ CosD} - 2nd \text{ CosD}|) \quad (8)$$

where 1st Cos D=1st Cosine distance=Minimum cosine distance between Topic $T_i$ and Topic $T_j$ (i.e., most similar topic pair between two models); and 2nd Cos D=2nd Cosine distance=2nd Minimum cosine distance between Topic $T_i$ and Topic $T_j$ (i.e., second-most similar topic pair between two models).

When assessing topic drift between two models trained on data from different time periods, a low Topic Match Entropy is desirable for showing that a good match can be made between a pair of topics from different models, and thus it may be asserted with higher confidence that the topic translated from the earlier model to the later. If a topic has a high Topic Match Entropy, it should be said that it does not have a single topic which stands out as a best fit in the second model.

Experimental Results—Measuring Model Building Topic Variability: The objective of this experiment is to understand how much topic definitions would change as a result of training two models on different samples from the same corpus. These differences are the result of randomness in the LDA model development process and variability in the training data. They are not due to changes in customer behavior over time, since the models are trained on samples generated from the same time period.

This experiment generates a result that quantifies differences in topic definitions when there are no changes in customer input over time or "drift". When training models from different time periods, differences in topic definitions with magnitudes at or below what would normally be observed in models trained from the same time period could be the result of some kind of drift or variability inherent in the data and model building process. Differences of that magnitude could not be attributed to changes in customer behavior or "drift". This also gives a drift magnitude below which changes in customer behavior are not detectable.

This experiment uses 55,000 customer communications related to a payment product ABCD from the year 2019.

Sampling and measuring strategy: 1) Randomly sample 55,000 customer communications from the base ABCD 2019 population; 2) generate random sample without replacement of 27,500 communications from the 55K customer communications to create Sample A; 3) the remaining 27,500 communications compose Sample B; 4) train models with thirty (30) topics for samples A and B and compare resulting topics, for test 1; and 5) iterate over steps 2, 3 and 4 to generate tests 2, 3, and 4.

A "highly similar topic" is defined herein as a topic that has a cosine distance match to a topic in a second model of less than 0.15. This threshold is chosen based on the difference observed in repeated model development runs and will change based on the context. The observed differences in topic word weights is likely to vary significantly based on sample size, data variability, and modeling parameters.

Figure 5:
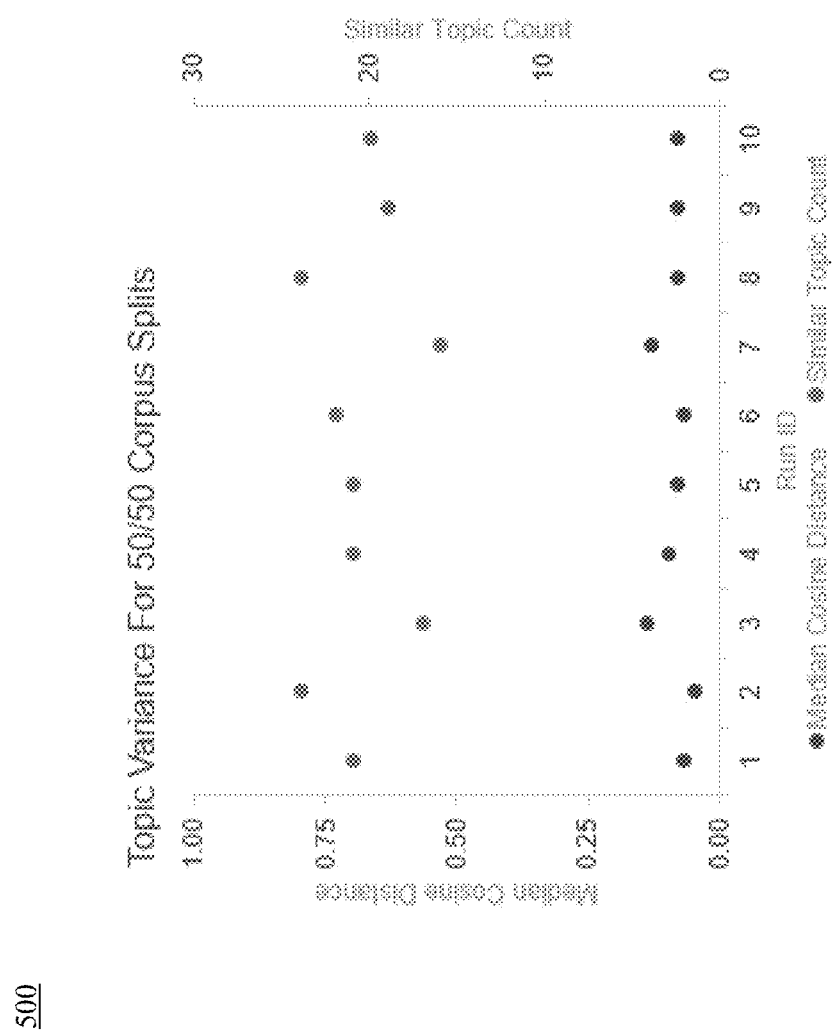
FIG. 5 is a graph that illustrates topic distance and similar topic count for an experimental observation of topic variance for a 50/50 corpus split with respect to training of LDA models, in accordance with an exemplary embodiment.

FIG. 5 is a graph 500 that illustrates topic distance and similar topic count for an experimental observation of topic variance for a 50/50 corpus split with respect to training of LDA models, in accordance with an exemplary embodiment.

Figure 7:
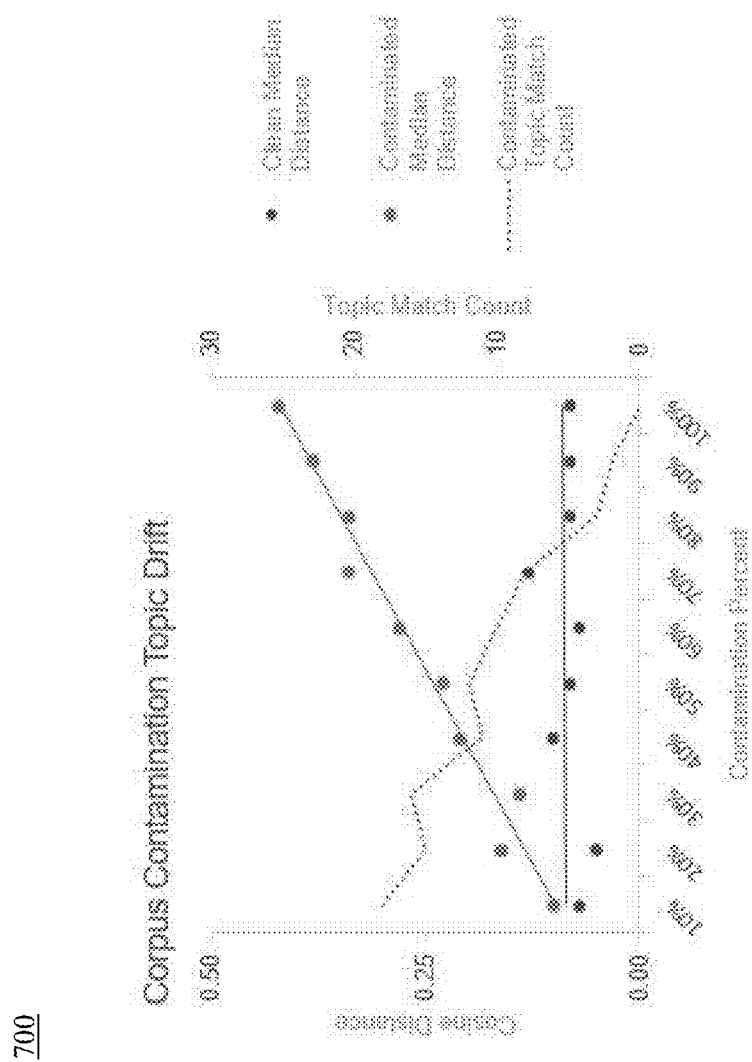
FIG. 7 is a graph that illustrates an impact of corpus contamination with respect to topic drift for an experimental observation with respect to with respect to training of LDA models for which a portion of the corpus is replaced with external data, in accordance with an exemplary embodiment.

FIG. 7 is a graph that illustrates an impact of corpus contamination with respect to topic drift for an experimental observation with respect to with respect to training of LDA models for which a portion of the corpus is replaced with external data, in accordance with an exemplary embodiment.

Results: As shown in FIG. 5, there is a median cosine drift between 0.05 and 0.14. The number of similar topics is between 16 and 24. This means that out of 30 topics generated by the first model, six to fourteen of them do not have a topic in the second model that was a "close" match as defined above. This potentially means that nearly half of the topics are not "real" and are a product of the particular random sample used and spurious pattern detection during model development.

Figure 6:
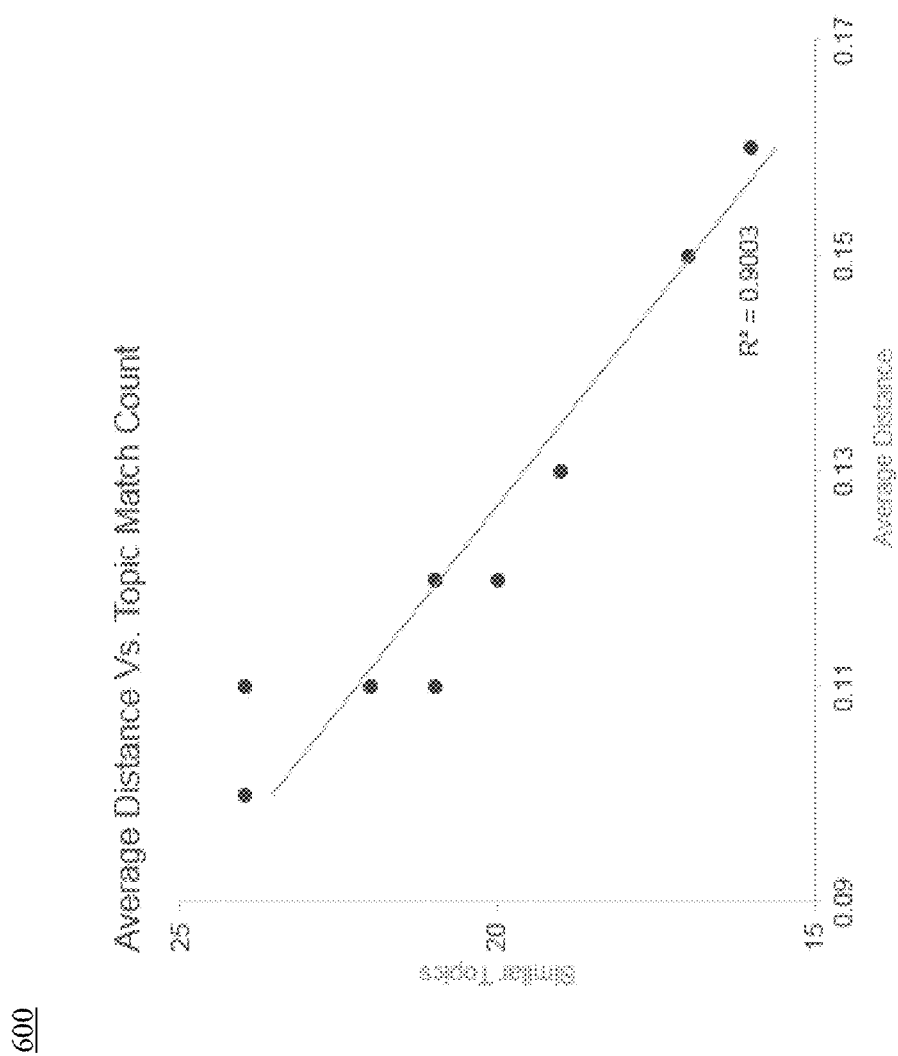
FIG. 6 is a graph that illustrates topic distance and similar topic count for an experimental observation of average distance versus topic match count with respect to training of LDA models, in accordance with an exemplary embodiment.

FIG. 6 is a graph 600 that illustrates topic distance and similar topic count for an experimental observation of topic variance for a 50/50 corpus split with respect to training of LDA models, in accordance with an exemplary embodiment. FIG. 6 shows the strength of the relationship between the average cosine distance measured between topic pairs and the overall number of topics that have a high quality match in both models.

Inference and Discussion: Even across samples drawn from the same corpus, randomness in the model training process and noise in the corpus results in changes in the number of topics that match between models and measures of inter-topic distances.

There is a strong relationship between average inter-topic distance and the number of topics that are matched between models. This supports the idea that cosine distance measurements are a useful tool in evaluating topic and model drift.

This experiment establishes a noise baseline which is peculiar to the corpus being used for the experiment and the tuning parameters that guide model training and topic articulation. This baseline sets the threshold which changes in customer behavior must overcome to be identified as genuine and not a result of variability inherent in the data and model development process.

Comparing model topics generated across repeated random samples from a corpus may be a way to separate "real" topics versus those articulated by the model because of peculiarities in a specific random sample. A topic filtering approach based on this concept may result in keeping topics which are only found in M of N random samples (e.g., found in 8 out of 10 random samples) as the only "real" topics.

Measuring Data Drift Induced Topic Variability: The objective of this experiment is to understand how the count of similar topics and cosine distances between topics change as the data in one sample is gradually replaced with customer communication records from a different corpus. This is done by splitting the records into two random samples and gradually replacing increasing percentages of one sample with records from another corpus. This simulates a situation where the prevalence of some themes in old customer communication diminish and are replaced with new themes. It is expected that the number of topic matches between the two models to decrease as the new model builds topics out of the new themes and cosine distances between topics generally to increase.

The experiment results are to be interpreted in the context of certain caveats. One potential weakness in the experiment setup relative to understanding model drift behavior in the real world is that it simulates a situation where the customer communication volume remains the same and new themes replace old themes. In the real world, the frequency of communication related to old themes may continue apace or may increase and new themes would be added to the existing volumes. This would change the ratios of old to new, which would influence the ability of the second model to detect new themes.

Another area that might limit how well the performance of this experiment can be generalized is that the performance is dependent on how unique and uniform the contaminating data are. If the contaminating data are very similar semantically to the base data, then it is likely to lead to an underestimate with respect to how well the new model detects themes in new communication. The reverse is also true; i.e., if the contamination data is very different, then there is a higher likelihood of an overestimation regarding how well the model detects new themes generally. Also, the contaminating data might be very different than base data, but if the themes in the contaminating data are exceptionally high, the model will have a harder time finding a critical mass of cases to build new coherent model topics.

Sampling and measuring strategy: 1) Start with the original 55,000 samples from the base Action-Based Conversations Dataset (ABCD) 2019 corpus. 2) Generate random sample without replacement of 27,500 from the 55K customer communications to create Sample A; the remaining 27,500 compose Sample B. 3) Replace 10% of the cases in Sample B with customer communications that have been labeled with a non-Automated Clearing House (i.e., non-ACH) product. This may be referred to as "10% contamination". 4) Train models on the two samples. 5) Determine whether an observed metric shift is large enough that it can be unequivocally attributed to drift, rather than natural variability. 6) Repeat steps 3, 4, and 5 while increasing the percentage of contamination to determine an optimal threshold for detection.

FIG. 7 is a graph 700 that illustrates an impact of corpus contamination with respect to topic drift for an experimental observation with respect to with respect to training of LDA models for which a portion of the corpus is replaced with external data, in accordance with an exemplary embodiment.

A "highly similar topic" is defined above as a topic that has a cosine distance match to a topic in a second model of less than 0.15. As shown in FIG. 7, the median cosine distance increases as the percent of the baseline corpus that is replaced increases. FIG. 7 also shows that the median cosine distance remains relatively steady between models when the training corpus remains uncontaminated. The dotted line in FIG. 7 shows that the number of topics found by both models decreases as the percent of the baseline corpus that is replaced increases. The graph 700 includes measurements of median cosine drift between 0.05-0.14 for the uncontaminated corpus samples.

Inference and Discussion: Replacing part of the corpus with items generated from another domain increases inter-topic cosine distances between models. This supports the idea that cosine distance measurements may be of use in evaluating drift.

In this experiment, the models show noticeable changes in inter-topic distances that exceed baseline noise levels at about 30% and greater replacement contamination. Broad inferences using this experiment should only be made with caution. If run multiple times with different types of contamination, it is expected that inter-topic distance will be heavily dependent on the uniformity of the replacement noise and how different the contamination noise is from the baseline corpus.

To the degree that the contamination items are very different from baseline corpus items and highly uniform in their composition, it is expected that the second model will quickly and strongly identify a new emergent topic. In this case, it is expected that higher inter-topic distances and good topic matches between model development runs performed on random samples from the same corpus will occur.

If the contamination items have strong similarities to items in the baseline corpus, new topics are likely to take much longer to emerge. The model may also merge similar items from the baseline corpus and the contamination data into a hybrid topic, which may bear a strong resemblance to a topic generated from the baseline corpus alone. The "new" semantic distinction in such cases may be a dubious one.

If the contamination items are very different from each other, or close to random in the extreme case, it will be more difficult for the model to form coherent topics from those items. In this case, increasing contamination levels would reduce the material from the baseline corpus available to form topics but would not also provide material for forming new topics. This might influence the final articulation of the topics the model forms from the remaining baseline corpus items. However, without patterns in the contamination data, new coherent topics are unlikely to emerge and inter-topic distances may not change much even as contamination levels increase.

Identifying Emerging Topics Using Cosine Distance and Topic Match Entropy: The objective of this experiment is to understand how to detect when certain new topics have emerged or subsided in a document cluster, based on the analysis of a dynamic and/or rolling time window containing current and past user-generated content. This approach could be used to identify new kinds of intelligent information, such as, for example, the emergence of a new topic related to a financial fraudulent transaction or new product launch.

Sampling and measuring strategy: 1) Base data: Start with the original 110,000 customer communications from the base ACH 2019 population. 2) Synthetic data generation: Generate 108,700 samples of fake documents. Each document belongs to any of seven classes for which descriptions are provided below. Each of these seven types of documents is designed in such a way that they are mutually exclusive to each other and also to the 2019 ACH data. Each of these seven synthetic documents is re-sampled multiple times to generate a total of 108,700 synthetic documents.

The frequency distribution and content for each of these seven unique document types include the following: 1) Doc 1=Chip manufacturers getting around quantum tunneling in the manufacturing of smaller computer chips. 2) Doc 2=Fusion power offers the prospect of an almost inexhaustible source of energy for future generations. 3) Doc 3=Computer vision is to images as Natural language processing (NLP) is to words. 4) Doc 4=In mathematics, linear programming is a method of optimizing operations with some constraints. 5) Doc 5=Deep learning is a subset of machine learning, which is essentially a neural network with more layers. 6) Doc 6=Genetic algorithms are metaheuristic algorithms that belong to a larger superset of evolutionary algorithms. 7) Doc 7=Maxwell equations are a set of coupled partial differential equations in electromagnetism.

| Document ID | Frequency distribution |
|---|---|
| Doc 1 | 40,000 |
| Doc 2 | 30,000 |
| Doc 3 | 20,000 |
| Doc 4 | 10,000 |
| Doc 5 | 5,000 |
| Doc 6 | 2,500 |
| Doc 7 | 1,200 |

Model training: Train two LDA probabilistic models. First topic model is trained with 110,000 ACH documents from 2019. Second topic model is trained with 110,000 ACH documents from 2019 and a corpus of 108,700 synthetically generated documents.

Drift Key Performance Indicators (KPIs)—The LDA models drift metrics may be calculated as follows: 1) Absolute cosine distance between each topic vector pair from the two models; and/or 2) topic match entropy between each topic vector pair from the two models.

KPIs Threshold: Identify topics from second LDA model for which the first cosine distance is greater than or equal to 0.5 and the topic match entropy is also greater than or equal to 0.5.

Inference and Discussion: Using the topic vector drift KPIs between topic model 1 and topic model 2 as defined above, it is possible to identify all seven of the new document classes as seven new topics with some confidence. The confidence is determined by the drift KPI values. The identification of seven new topics has varying drift KPI scores, as some synthetic document types have very low frequencies (e.g., Doc 7) and others have very high frequencies (e.g., Doc 1, 2 & 3).

The number of generated topic vectors for each of the models is 40, which is based on reviewing the coherence score and the perplexity score. The same vocabulary dictionary, which has an approximate length of 3000 tokens, is used for both of the models. Based on the topic drift KPIs, the seven new topics generated from Topic model 2 are identifiable out of the 40 topics. It is observed that for each of the seven synthetic document types, there is a corresponding topic vector; and with decreasing value of frequency for the synthetic documents, the beta distribution value also decreases accordingly for the topic vectors.

| New Topic ID | Minimum Cosine Distance | Topic match Entropy |
|---|---|---|
| Topic 1 | 1.00 | 1.00 |
| Topic 2 | 1.00 | 1.00 |
| Topic 3 | 1.00 | 1.00 |
| Topic 4 | 1.00 | 1.00 |
| Topic 5 | 0.94 | 0.97 |
| Topic 6 | 0.89 | 0.92 |
| Topic 7 | 0.37 | 0.50 |

Topic 1 =

0.496 * "chip quantum tunnel $manufactur$"+0.496 * "$manufactur$ small"

+0.000 * "need"+0.000 * "debit"+0.000 * "add"+0.000 * "block"

+0.000 * "request"+0.000 * "allow"+0.000 * "form"+0.000 * "end".

Topic 2 = 0.333 * "$energi$"+0.331 * "$gener$ fusion prospect inexhaust"

+0.331 * "offer $sourc$ power $futur$"+0.000 * "need"

+0.000 * "attach"+0.000 * "payment"+0.000 * "$receiv$"

+0.000 * "return"+0.000 * "client"+0.000 * "fund".

Topic 3 = 0.495 * "process word languag $natur$"

+0.495 * "$nlp$ vision"+0.000 * "payment"+0.000 * "contact"

+0.000 * "need"+0.000 * "in-form"+0.000 * "receiv"

+0.000 * "help"+0.000 * "$mathemat$ oper program method"

+0.000 * "constraint linear optimis".

Topic 4 = 0.496 * "$mathemat$ oper program method"

+0.496 * "constraint linear optimis"+0.000 * "$energi$"

+0.000 * "$gener$ fusion prospect inexhaust"

+0.000 * "offer $sourc$ power $futur$"+0.000 * "payment"

+0.000 * "tell"+0.000 * "request"+0.000 * "debit"+0.000 * "pai".

Topic 5 = 0.366 * "subset deep learn $essenti$"

+0.366 * "layer machin network neural"+0.019 * "direct"

+0.017 * "deposit"+0.013 * "file"+0.010 * "payrol"+0.008 * "employe"

+0.008 * "process"+0.007 * "$intuit$ trace $incom$"+0.007 * "verify".

Topic 6 =

0.221 * "belong $larg$ algorithm $genet$"+0.221 * "$metaheurist evolutionari$"

+0.012 * "debit"+0.012 * "need"+0.012 * "origin"+0.011 * "caus"

+0.011 * "credit"+0.010 * "overdraft"+0.010 * "return"+0.009 * "legitim".

Topic 7 =

0.065 * "maxwel $differenti$ partial electromagnet"+0.065 * "$equat coupl$"

+0.030 * "list"+0.024 * "need"+0.021 * "discuss"+0.019 * "current"

+0.017 * "document"+0.016 * "$happi$"+0.015 * "debit"+0.015 * "attach".

It may be observed that by using cosine distance topic drift entropy, emerging topics may be detected. In an exemplary embodiment, when the topic match entropy is greater than or equal to 0.5, this indicates an emerging topic.

| Minimum Cosine distance | Comment |
|---|---|
| 0.0-0.3 | Two topics are similar |
| 0.3-0.5 | Need to evaluate the topics manually and decide |
| Greater than 0.5 | Two topics are not similar |

Accordingly, with this technology, an optimized process for counteracting model drift by maintaining freshness and accuracy in a LDA model by leveraging LDA classification and vector algebra to detect potential degradations is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for maintaining freshness in a Latent Dirichlet Allocation (LDA) model, the method being implemented by at least one processor, the method comprising:
   receiving, by the at least one processor, a first corpus that includes a first set of textual data;
   generating, by the at least one processor, a first set of LDA topics by applying a first LDA model to the first corpus;
   generating, by the at least one processor for each respective topic from among the first set of LDA topics, a corresponding vector of words with associated weights;
   measuring, by the at least one processor, a cosine similarity of at least a first topic from among the first set of LDA topics with respect to at least one topic from among a second set of LDA topics that is associated with a second LDA model;
   determining, based on a result of the measuring, a topic match entropy between the first LDA model and the second LDA model; and when the topic match entropy exceeds a predetermined threshold, determining that the first LDA model has drifted and requires retraining, wherein the topic match entropy is determined by applying an expression of Topic Match Entropy=(1st Cos D)/(1−(ABS|1st Cos D−2nd Cos D|)), where the 1st Cos D is equal to a first minimum cosine distance between Topic $T_i$ and Topic $T_j$, and the 2nd Cos D is equal to a second minimum cosine distance between Topic $T_i$ and Topic $T_j$.

2. The method of claim 1, wherein the first corpus includes an Action-Based Conversations Dataset (ABCD) corpus that is associated with a predetermined year.

3. The method of claim 1, wherein for each respective topic from among the first set of LDA topics, the corresponding vector has a length that is equal to a number of words included in a vocabulary used for training the first LDA model.

4. The method of claim 3, wherein for each respective topic from among the first set of LDA topics, each respective word included in the corresponding vector is associated with a corresponding weight that represents a topic-word density that indicates a strength of association between the respective word and the respective topic.

5. The method of claim 1, wherein for the first topic from among the first set of LDA topics, the at least one topic from among the second set of LDA topics for which the cosine similarity is measured corresponds to a cosine similarity that falls in a range of between 0.85 and 1.00.

6. The method of claim 1, wherein each of the first LDA model and the second LDA model is trained by using a first subset of a predetermined sampling of the first corpus and a second subset of the predetermined sampling of the first corpus, a content of the first subset being mutually exclusive with respect to a content of the second subset.

7. The method of claim 1, wherein each of the first LDA model and the second LDA model is trained by using a first subset of a predetermined sampling of the first corpus and a second set that is generated by replacing a predetermined portion of a second subset of the predetermined sampling of the first corpus with a randomly selected sampling of a second corpus, a content of the first subset being mutually exclusive with respect to a content of the second subset.

8. The method of claim 1, wherein each of the first LDA model and the second LDA model is trained by using a first subset of a predetermined sampling of the first corpus and a second set that includes a sampling of a set of synthetically generated documents.

9. A computing apparatus for maintaining freshness in a Latent Dirichlet Allocation (LDA) model, the computing apparatus comprising:
a processor;
a memory; and
a communication interface coupled to each of the processor and the memory,
wherein the processor is configured to:
receive, via the communication interface, a first corpus that includes a first set of textual data;
generate a first set of LDA topics by applying a first LDA model to the first corpus;
generate, for each respective topic from among the first set of LDA topics, a corresponding vector of words with associated weights;
measure a cosine similarity of at least a first topic from among the first set of LDA topics with respect to at least one topic from among a second set of LDA topics that is associated with a second LDA model;
determine, based on a result of the measurement, a topic match entropy between the first LDA model and the second LDA model; and
when the topic match entropy exceeds a predetermined threshold, determine that the first LDA model has drifted and requires retraining, wherein the topic match entropy is determined by applying an expression of Topic Match Entropy=(1st Cos D)/(1−(ABS|1st Cos D−2nd Cos D|)), where the 1st Cos D is equal to a first minimum cosine distance between Topic $T_i$ and Topic $T_j$, and the 2nd Cos D is equal to a second minimum cosine distance between Topic $T_i$ and Topic $T_j$.

10. The computing apparatus of claim 9, wherein the first corpus includes an Action-Based Conversations Dataset (ABCD) corpus that is associated with a predetermined year.

11. The computing apparatus of claim 9, wherein for each respective topic from among the first set of LDA topics, the corresponding vector has a length that is equal to a number of words included in a vocabulary used for training the first LDA model.

12. The computing apparatus of claim 11, wherein for each respective topic from among the first set of LDA topics, each respective word included in the corresponding vector is associated with a corresponding weight that represents a topic-word density that indicates a strength of association between the respective word and the respective topic.

13. The computing apparatus of claim 9, wherein for the first topic from among the first set of LDA topics, the at least one topic from among the second set of LDA topics for which the cosine similarity is measured corresponds to a cosine similarity that falls in a range of between 0.85 and 1.00.

14. The computing apparatus of claim 9, wherein each of the first LDA model and the second LDA model is trained by using a first subset of a predetermined sampling of the first corpus and a second subset of the predetermined sampling of the first corpus, a content of the first subset being mutually exclusive with respect to a content of the second subset.

15. The computing apparatus of claim 9, wherein each of the first LDA model and the second LDA model is trained by using a first subset of a predetermined sampling of the first corpus and a second set that is generated by replacing a predetermined portion of a second subset of the predetermined sampling of the first corpus with a randomly selected sampling of a second corpus, a content of the first subset being mutually exclusive with respect to a content of the second subset.

16. The computing apparatus of claim 9, wherein each of the first LDA model and the second LDA model is trained by using a first subset of a predetermined sampling of the first corpus and a second set that includes a sampling of a set of synthetically generated documents.

17. A non-transitory computer readable storage medium storing instructions for maintaining freshness in a Latent Dirichlet Allocation (LDA) model, the storage medium comprising executable code which, when executed by a processor, causes the processor to:
receive a first corpus that includes a first set of textual data;
generate a first set of LDA topics by applying a first LDA model to the first corpus;
generate, for each respective topic from among the first set of LDA topics, a corresponding vector of words with associated weights;
measure a cosine similarity of at least a first topic from among the first set of LDA topics with respect to at least one topic from among a second set of LDA topics that is associated with a second LDA model;

determine, based on a result of the measurement, a topic match entropy between the first LDA model and the second LDA model; and when the topic match entropy exceeds a predetermined threshold, determine that the first LDA model has drifted and requires retraining, wherein the topic match entropy is determined by applying an expression of Topic Match Entropy=(1st Cos D)/(1−(ABS|1st Cos D−2nd Cos D|)), where the 1st Cos D is equal to a first minimum cosine distance between Topic $T_i$ and Topic $T_j$, and the 2nd Cos D is equal to a second minimum cosine distance between Topic $T_i$ and Topic $T_j$.

18. The storage medium of claim 17, wherein the first corpus includes an Action-Based Conversations Dataset (ABCD) corpus that is associated with a predetermined year.

19. The storage medium of claim 17, wherein for each respective topic from among the first set of LDA topics, the corresponding vector has a length that is equal to a number of words included in a vocabulary used for training the first LDA model.

20. The storage medium of claim 19, wherein for each respective topic from among the first set of LDA topics, each respective word included in the corresponding vector is associated with a corresponding weight that represents a topic-word density that indicates a strength of association between the respective word and the respective topic.

\* \* \* \* \*